(12) United States Patent
Fujita et al.

(10) Patent No.: US 8,178,178 B2
(45) Date of Patent: May 15, 2012

(54) PROCESS FOR SEALING GLASS CONTAINERS, GLASS CONTAINERS AND COATING MATERIAL

(75) Inventors: Noriyuki Fujita, Kanagawa (JP); Yasuhiro Gogun, Kanagawa (JP)

(73) Assignee: Toyo Glass Co., Ltd., Tokyo (JP)

( * ) Notice: Subject to any disclaimer, the term of this patent is extended or adjusted under 35 U.S.C. 154(b) by 194 days.

(21) Appl. No.: 12/733,597

(22) PCT Filed: Oct. 2, 2008

(86) PCT No.: PCT/JP2008/067944
§ 371 (c)(1),
(2), (4) Date: Mar. 10, 2010

(87) PCT Pub. No.: WO2009/054247
PCT Pub. Date: Apr. 30, 2009

(65) Prior Publication Data
US 2010/0272934 A1    Oct. 28, 2010

(30) Foreign Application Priority Data

Oct. 22, 2007   (JP) .................................. 2007-274139
Sep. 25, 2008   (JP) .................................. 2008-245684

(51) Int. Cl.
| | |
|---|---|
| *A47G 19/22* | (2006.01) |
| *B28B 21/00* | (2006.01) |
| *B28B 21/72* | (2006.01) |
| *B28B 23/08* | (2006.01) |
| *B29D 22/00* | (2006.01) |
| *B29D 23/00* | (2006.01) |
| *B32B 1/08* | (2006.01) |
| *C03C 17/32* | (2006.01) |
| *F16L 9/10* | (2006.01) |

(52) U.S. Cl. ..... 428/34.7; 428/34.4; 156/69; 106/156.5; 106/135.1; 106/156.2

(58) Field of Classification Search ................. 428/34.7, 428/34.4; 156/69; 106/156.5, 135.1, 156.2
See application file for complete search history.

(56) References Cited

U.S. PATENT DOCUMENTS
2004/0033316 A1 * 2/2004 Carbonell et al. ......... 427/430.1

FOREIGN PATENT DOCUMENTS
| JP | 58-82805 | 5/1983 |
|---|---|---|
| JP | 3-45677 | 2/1991 |
| JP | 2003-160161 | 6/2003 |
| JP | 2003-226350 | 8/2003 |
| JP | 2003-226353 | 8/2003 |
| JP | 2005-177542 | 7/2005 |
| JP | 2006-298432 | 11/2006 |

OTHER PUBLICATIONS

International Search Report issued Jan. 13, 2009 in International (PCT) Application No. PCT/JP2008/067944.

* cited by examiner

*Primary Examiner* — Michael C Miggins
(74) *Attorney, Agent, or Firm* — Wenderoth, Lind & Ponack, L.L.P.

(57) ABSTRACT

The top of an opening of a glass container is hot end coated, and then is coated with a coating agent of an aqueous solution containing casein and polyphenol and one or more members selected from copper sulfates, calcium hydroxides, and ferric chlorides. Thereafter, a sealing material, to which a thermoplastic resin is applied, is adhered to the top of the opening of the glass container, whereby the water resistance of the sealing of the glass container becomes excellent irrespective of weathering of glass.

10 Claims, 7 Drawing Sheets

PROCESS FOR SEALING GLASS CONTAINERS, GLASS CONTAINERS AND COATING MATERIAL

TECHNICAL FIELD

The present invention relates to a glass container sealing method that achieves sealing with excellent water resistance irrespective of weathering of glass containers when the content is sealed by adhering a thin sheet sealing material to the opening of the glass containers, a glass container that is sealed by the sealing method, and a coating agent for use in the method.

BACKGROUND ART

Heretofore, high frequency heat seals for sealing a glass container by attaching a cap inside of which is covered with a sealing material (e.g., a material in which an adhesive layer of a thermoplastic synthetic resin film is laminated to the under surface of aluminum foil) to the top of the opening of a glass container, and high-frequency heating the cap for welding of the synthetic resin film of the sealing material to the top of the opening of the glass container or heat seals for sealing a glass container by disposing a sealing material (a material having an adhesive layer of a thermoplastic synthetic resin film on the rear surface) to the opening of a glass container, and heating the sealing material from the front surface side thereof for welding of the synthetic resin film have been known.

The following Patent Documents 1 to 5 disclose sealing methods for increasing sealing strength or securing sealing strength also to weathered glass containers when such sealing is performed.

Patent Document 1 discloses coating the top of the opening of glass containers with saccharides. Patent Document 2 discloses coating the top of the opening of glass containers with polyvalent metal salts and saccharides. Patent Document 3 discloses coating the top of the opening of glass containers with polyvalent metal salts. Patent Document 4 discloses hot end coating the top of the opening of glass containers, coating the same with a silicon oxide or silicate, and further coating the same with a silane coupling agent. Patent Document 5 discloses coating the top of the opening of glass containers with pectin.

Patent-Document 1: Japanese Unexamined Patent Application Publication No. 2003-160161
Patent-Document 2: Japanese Unexamined Patent Application Publication No. 2003-226350
Patent-Document 3: Patent-Document 1: Japanese Unexamined Patent Application Publication No. 2003-226353
Patent Document 4: Patent-Document 1: Japanese Unexamined Patent Application Publication No. 2005-177542
Patent Document 5: Japanese Unexamined Patent Application Publication No. 2006-298432

All the above-described former techniques increase seal strength or secure sufficient seal strength even when glass is weathered, but have been insufficient from the viewpoint of water resistance of sealing.

SUMMARY OF THE INVENTION

It is an object of the present invention to achieve sealing with excellent water resistance irrespective of weathering of glass.

The present invention is a glass container sealing method including: hot end coating the top of an opening of a glass container; coating the top of the opening of the glass container with a coating agent of an aqueous solution containing casein and polyphenol and one or more members selected from copper sulfates, calcium hydroxides, and ferric chlorides; and adhering a sealing material, to which a thermoplastic resin is applied, to the top of the opening of the glass container.

By the hot end coating, a tin compound (mainly tin tetrachloride) or a titanium compound (mainly titanium tetrachloride) is made to act on the outer surface of a hot glass container immediately after molding near the inlet of a slow cooling furnace to form a tin oxide or titanium oxide coating on the outer surface of the glass container. By performing the hot end coating, the adhesiveness of a coating film to the glass surface in a next process improves.

The invention is the glass container sealing method of the present invention, in which the concentration of the casein in the coating agent is 5.0 to 0.05 wt %, the concentration of the polyphenol is 1.0 to 0.01 wt %, the concentration of the copper sulfates, calcium hydroxides, or ferric chlorides is 1.0 to 0.005 wt % in total.

The invention is a glass container sealing method including: hot end coating the top of an opening of the glass container; coating the top of the opening of the glass container with a coating agent of an aqueous solution containing 5.0 to 0.05 wt % of casein, 1.0 to 0.01 wt % of polyphenol, and 0.1 to 0.005 wt % of calcium hydroxide; and adhering a sealing material, to which a thermoplastic resin is applied, to the top of the opening of the glass container.

The invention is the glass container sealing method of the present invention, in which the polyphenol is tannic acid or gallic acid.

The polyphenol refers to phenol having two or more hydroxy groups in the same molecule, such as tannic acid, gallic acid, catechin, rutin, or isoflavone. In the invention, tannic acid or gallic acid is preferable.

The invention is a glass container, which is sealed by the sealing method of the present invention.

The invention is a coating agent, which is an aqueous solution containing casein and polyphenol and one or more members selected from copper sulfates, calcium hydroxides, and ferric chlorides.

The invention is the coating agent of the present invention, in which the concentration of the casein is 5.0 to 0.05 wt %, the concentration of the polyphenol is 1.0 to 0.01 wt %, the concentration of the copper sulfates, calcium hydroxides, or ferric chlorides is 1.0 to 0.005 wt % in total.

The invention is a coating agent, which is an aqueous solution containing 5.0 to 0.05 wt % of casein, 1.0 to 0.01 wt % of polyphenol, and 0.1 to 0.005 wt % of calcium hydroxide.

The invention is the coating agent of the present invention, in which the polyphenol is tannic acid or gallic acid.

The invention is a glass container, in which the top of an opening of the glass container is hot end coated, and the coating agent of the present invention is further applied thereto.

FIG. 1 is a schematic view of a glass surface that is coated with the coating agent of the invention. In FIG. 1, "K" represents casein and "P" represents polyphenol.

Casein is a typical example of phosphoprotein in which phosphoric acid is bonded to a large number of portions derived from serine among amino acids constituting the protein thereof. The components thereof are not single proteins and roughly classified into three kinds of α-casein (alpha casein), β-casein (beta casein), and κ-casein (kappa casein).

The amino acids refer to organic compounds having functional groups of both amino groups and carboxyl groups. The polyphenol is an aromatic compound having a large number of phenolic hydroxyl groups.

In general, as the molecular weight increases, substances become difficult to melt in water. Polyphenol and casein are bonded to each other by amide bond (—NH—CO—) or the like to form a substance having a large molecular weight. When calcium, copper, and iron are further added, they react with hydroxy groups and carboxyl groups having an excess of these metals to form salts that are more difficult to melt, and thus, it is estimated that the water resistance increases.

FIG. 1 illustrates a case where the coating agent contains calcium hydroxide. However, when copper sulfate or ferric chloride is contained, "Ca" in FIG. 1 is replaced by "Cu" or Fe.

In FIG. 1, a hot end coating layer is omitted.

Effects of Invention

According to the sealing method of the invention, the water resistance of sealing of glass containers becomes extremely excellent irrespective of the weathering degree of the glass.

In the glass container of the invention, the sealing of the opening is extremely excellent in water resistance irrespective of the weathering degree of the glass. Thus, the sealing can prevent deterioration of the contents due to the entry of water or moisture into the container caused by breakage of the sealing due to water or moisture.

The coating agent of the invention is a coating agent for use in the sealing method of the invention described above, and can achieve sealing with extremely excellent water resistance irrespective of the weathering degree of glass by hot end coating the opening of a glass container, and then further coating the same.

REFERENCE NUMERALS

Figure 1:
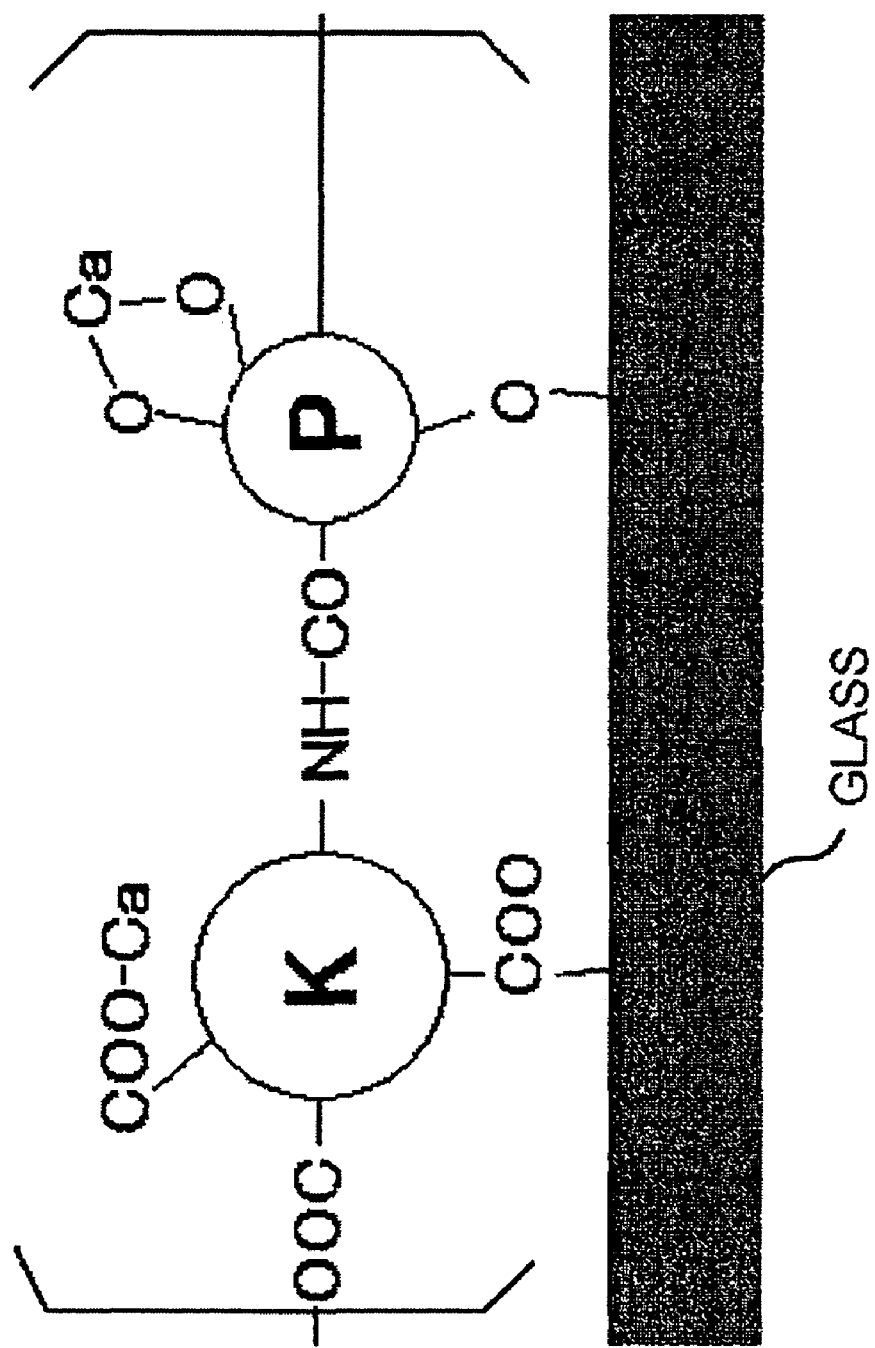
FIG. 1 is a schematic view of a coated glass surface.

1 glass bottle
2 sealing material
3 water tank
4 water

DETAILED DESCRIPTION OF THE INVENTION

In the coating agent of the invention, the concentration of casein is preferably 5.0 to 0.05 wt %, the concentration of polyphenol is preferably 1.0 to 0.01 wt %, and the concentration of copper sulfates, calcium hydroxides, or ferric chlorides is preferably 1.0 to 0.005 wt % in total. When the calcium hydroxide among the metal salts above is singly contained, the concentration thereof is preferably 0.1 to 0.01 wt %.

When the concentration of casein is adjusted to be 5.0 wt % or more, the coated glass container becomes slightly cloudy. When the concentration of casein is adjusted to be 0.05 wt % or lower, the water resistance of the sealing when the glass container is stored over a long period of time is poor. The same applies to polyphenol. When the concentration of polyphenol is 1.0% or more, the glass container becomes slightly cloudy. When the concentration of polyphenol is 0.01 wt % or lower, the water resistance of the sealing when the glass container is stored over a long period of time is poor. When the concentration of copper sulfates, calcium hydroxides, or ferric chlorides is 0.005% or lower in total, the sealing of the glass container is not imparted with sufficient water resistance. In contrast, when copper sulfates, calcium hydroxides, or ferric chlorides are added in a proportion as high as 1.0%, sufficient water resistance is obtained and it is not necessary to add any more.

The coating agent of the invention is preferably adjusted to be alkaline for dissolving casein. In order to adjust the coating agent to be alkaline, ammonia may be added, for example. The alkaline degree may be adjusted so that casein thoroughly dissolves, and is not particularly limited. Ammonia thoroughly volatilizes when the coating agent dries.

In the invention, the temperature of the glass container when coated with the coating agent is not particularly limited. The temperature of the glass container may be adjusted so that the coating agent can be uniformly applied, and then the coating agent is sufficiently dried. For example, the coating agent can be applied immediately after the glass container comes out of a slow cooling furnace (surface temperature of about 90 to 130° C.).

The drying temperature is not particularly limited, and natural drying or forced drying may be employed.

Coating methods of the coating agent are not limited, and may be spray coating, coater coating, brush coating, dip coating (immersion coating), or the like.

EXAMPLES

Conditions for Carrying Out Examples and Comparative Examples

Glass bottles that were hot end coated with a tin oxide were allowed to stand in an electric oven that was heated to 120° C. (Examples 1 to 3 and Comparative Examples thereof) or 100° C. (Examples 4 and 5 and Comparative Examples 4 and 5) for 20 minutes or more to warm the glass bottles. The top of the opening of the warmed glass bottles was spray coated with a coating agent using an experimental coating device under the following conditions.

Spray nozzle: needle spray
Spray moving speed: 60 cm/second
Flow rate: 50 ml/minute×4 times (Examples 1 to 3 and Comparative Examples thereof)
　　100 ml/minute×4 times (Examples 4 and 5 and Comparative Examples 4 and 5)
Drying: natural drying

[Acceleration of Weathering]

Half of the glass bottles of Examples and Comparative Examples produced as described above were stored for 12 hours in a high temperature and high humidity chamber having a temperature of 70° C. and a humidity of 90%, thereby producing samples in which weathering was accelerated. The experiment confirmed that the weathering is equivalent to weathering when stored in one year in the case of storage at a usual room temperature.

The remaining half of the glass bottles were stored for a short period of time at usual room temperature, thereby producing samples that were hardly weathered.

[Sealing Conditions]

An aluminum sealing material 2 was adhered to the samples above under the following sealing conditions.

High frequency sealing machine: conveyor type high frequency sealing device ω-F53S (trade name, manufactured by High frequency field k.k.)
    Coil height: 18 mm (height from the cap upper surface to a heating coil)
    Output: 650 (138 V, 13 A)
    Heating coil passage time: 3 seconds (Examples 1 to 4 and Comparative Examples thereof)
    2.2 seconds (Example 5 and comparative example 5)

[Water Resistance Evaluation Method]

Figure 2:
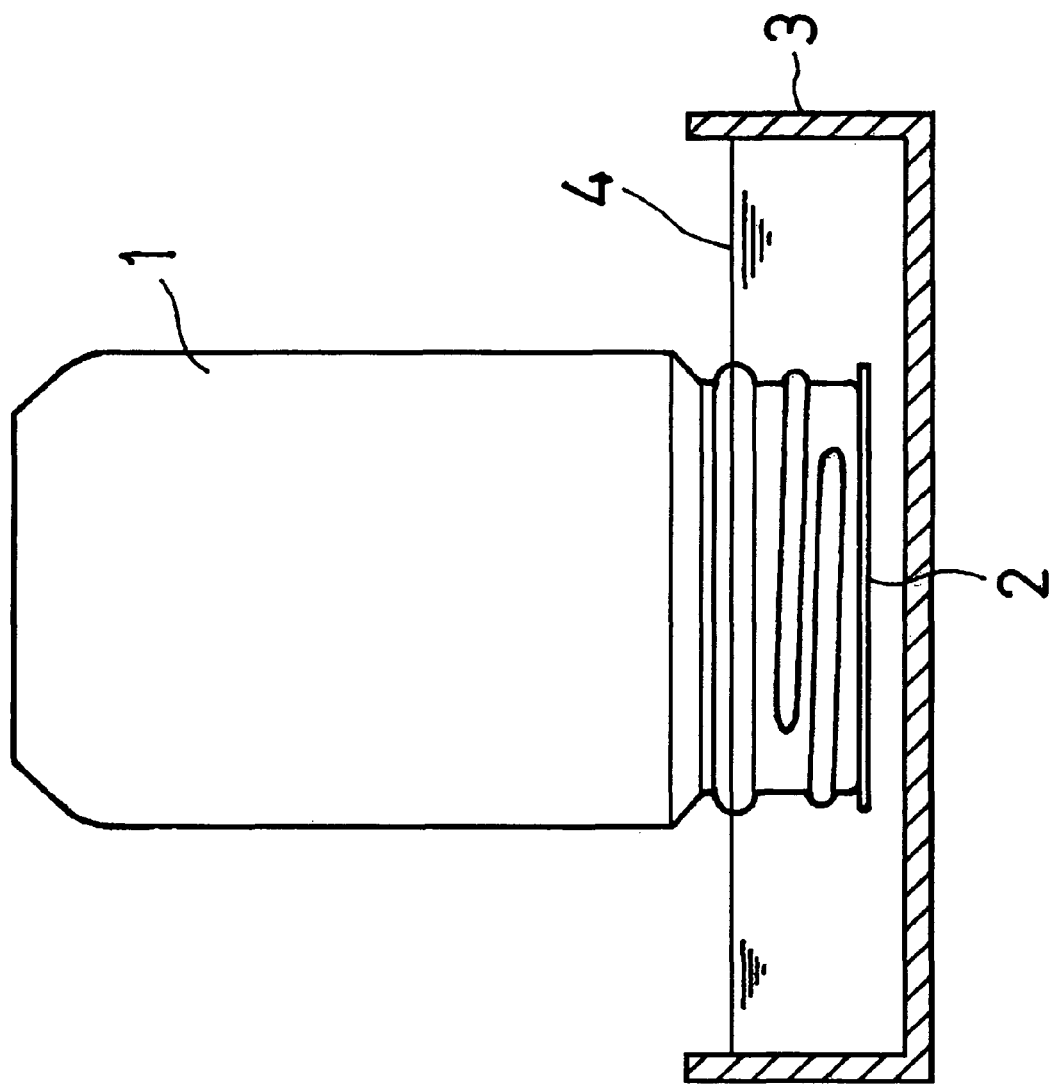
FIG. 2 is an explanatory view of a method for carrying out a water resistance evaluation test.

In order to evaluate the weather resistance (water resistance) against the humidity and the moisture in the air, evaluation was performed by the following test method. A schematic view is illustrated in FIG. 2.

Glass bottles 1 of Examples and Comparative Examples in some of which weathering was accelerated and some of which weathering was hardly accelerated were charged with powder (instant coffee), and an aluminum sealing material 2 having a thermoplastic adhesive layer is adhered by a high frequency sealing machine. Thereafter, the opening was immersed in water 4 of a water tank 3, and then time for water to permeate in the bottles was measured. The longest immersion time was determined to be 32 hours. When water did not permeate in containers even after 32 hours passed, the test was discontinued. The reason for using instant coffee as powder resides in that when water permeates in the bottles, the powder melts to become black, which facilitates the confirmation of the entry of water.

Example 1 and Comparative Examples Thereof

The following coating agents were applied to produce Example 1 and Comparative Examples 1-2 to 1-4 (Comparative Example 1-1 having no coating).
    Example 1: aqueous solution of casein (0.25 wt %), tannic acid (0.05 wt %), copper sulfate (0.05 wt %), and ammonia (0.125 vol %)
    Comparative Example 1-1: no coating
    Comparative Example 1-2: aqueous solution of casein (0.25 wt %) and ammonia (0.025 vol %)
    Comparative Example 1-3: aqueous solution of casein (0.25 wt %), tannic acid (0.05 wt %), and ammonia (0.025 vol %)
    Comparative Example 1-4: aqueous solution of casein (0.25 wt %), copper sulfate (0.05 wt %), and ammonia (0.125 vol %)

Figure 3:
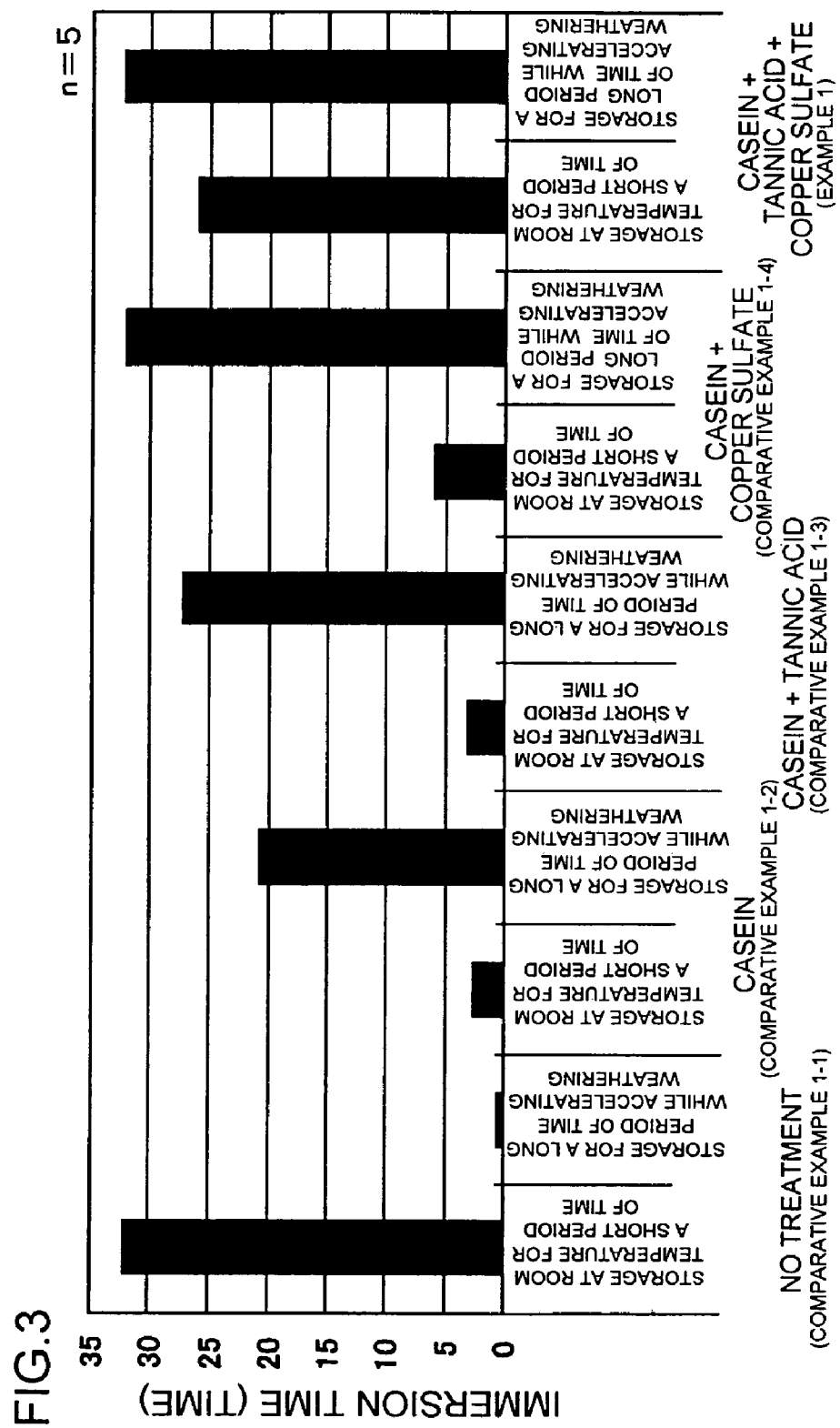
FIG. 3 is an explanatory view of water resistance evaluation test results of Example 1.

Example 1 and Comparative Examples 1-1 to 1-4 above were subjected to the above-described water resistance evaluation test. The results are shown in FIG. 3. In FIG. 3, the "storage at room temperature for a short period of time" represents the case where weathering hardly occurred and the "storage for a long period of time while accelerating weathering" represents the case where weathering is accelerated. Examples and Comparative Examples above were individually subjected to each of the "storage at room temperature for a short period of time" and the "storage for a long period of time while accelerating weathering" five times, and the average value is shown.

In Comparative Example 1-1, the water resistance is excellent when it was not weathered, but when it was weathered, the water resistance sharply decreases. In Comparative Examples 1-2 to 1-4, the water resistance when weathered is improved, but the water resistance when not weathered extremely deteriorates. In Example 1, the water resistance when weathered is remarkably excellent, and the water resistance when not weathered is satisfactory for practical use.

Therefore, Example 1 achieves high water resistance irrespective of the weathering degree.

Example 2 and Comparative Examples Thereof

The following coating agents were applied to produce Example 2 and Comparative Examples 2-2 to 2-4 (Comparative Example 2-1 having no coating).
    Example 2: aqueous solution of casein (0.25 wt %), tannic acid (0.05 wt %), calcium hydroxide (0.025 wt %), and ammonia (0.025 vol %)
    Comparative Example 2-1: no coating
    Comparative Example 2-2: aqueous solution of casein (0.25 wt %) and ammonia (0.025 vol %)
    Comparative Example 2-3: aqueous solution of casein (0.25 wt %), tannic acid (0.05 wt %), and ammonia (0.025 vol %)
    Comparative Example 2-4: aqueous solution of casein (0.25 wt %), calcium hydroxide (0.025 wt %), and ammonia (0.025 vol %)

Figure 4:
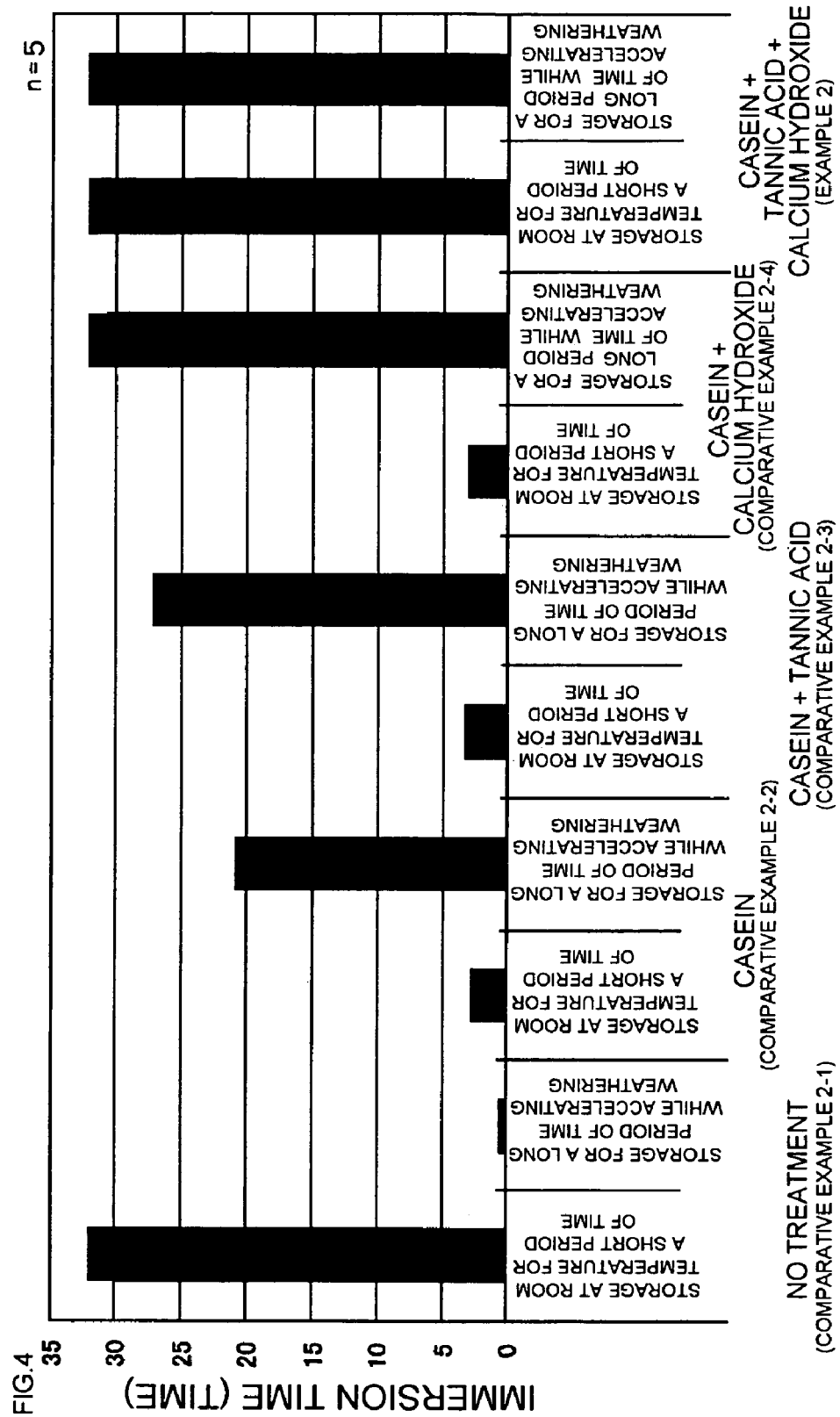
FIG. 4 is an explanatory view of water resistance evaluation test results of Example 2.

Example 2 and Comparative Examples 2-1 to 2-4 above were subjected to the above-described water resistance evaluation test. The results are shown in FIG. 4. In FIG. 4, the "storage at room temperature for a short period of time" represents the case where weathering hardly occurred and the "storage for a long period of time while accelerating weathering" represents the case where weathering is accelerated. Examples and Comparative Examples above were individually subjected to each of the "storage at room temperature for a short period of time" and the "storage for a long period of time while accelerating weathering" five times, and the average value is shown.

In Comparative Example 2-1, the water resistance is excellent when it was not weathered, but when it was weathered, the water resistance sharply decreases. In Comparative Examples 2-2 to 2-4, the water resistance when weathered is improved, but the water resistance when not weathered extremely deteriorates. Example 2 shows excellent water resistance both when weathered and when not weathered.

Therefore, Example 2 achieves high water resistance irrespective of the weathering degree.

Example 3 and Comparative Examples Thereof

The following coating agents were applied to produce Example 3 and Comparative Examples 3-2 to 3-4 (Comparative Example 3-1 having no coating).
    Example 3: Aqueous Solution of Casein (0.25 Wt %), Tannic Acid (0.05 Wt %), Ferric Chloride (0.075 Wt %), and Ammonia (0.025 vol %)
    Comparative Example 3-1: no coating
    Comparative Example 3-2: aqueous solution of casein (0.25 wt %) and ammonia (0.025 vol %)
    Comparative Example 3-3: aqueous solution of casein (0.25 wt %), tannic acid (0.05 wt %), and ammonia (0.025 vol %)
    Comparative Example 3-4: aqueous solution of casein (0.25 wt %), ferric chloride (0.075 wt %), and ammonia (0.025 vol %)

Figure 5:
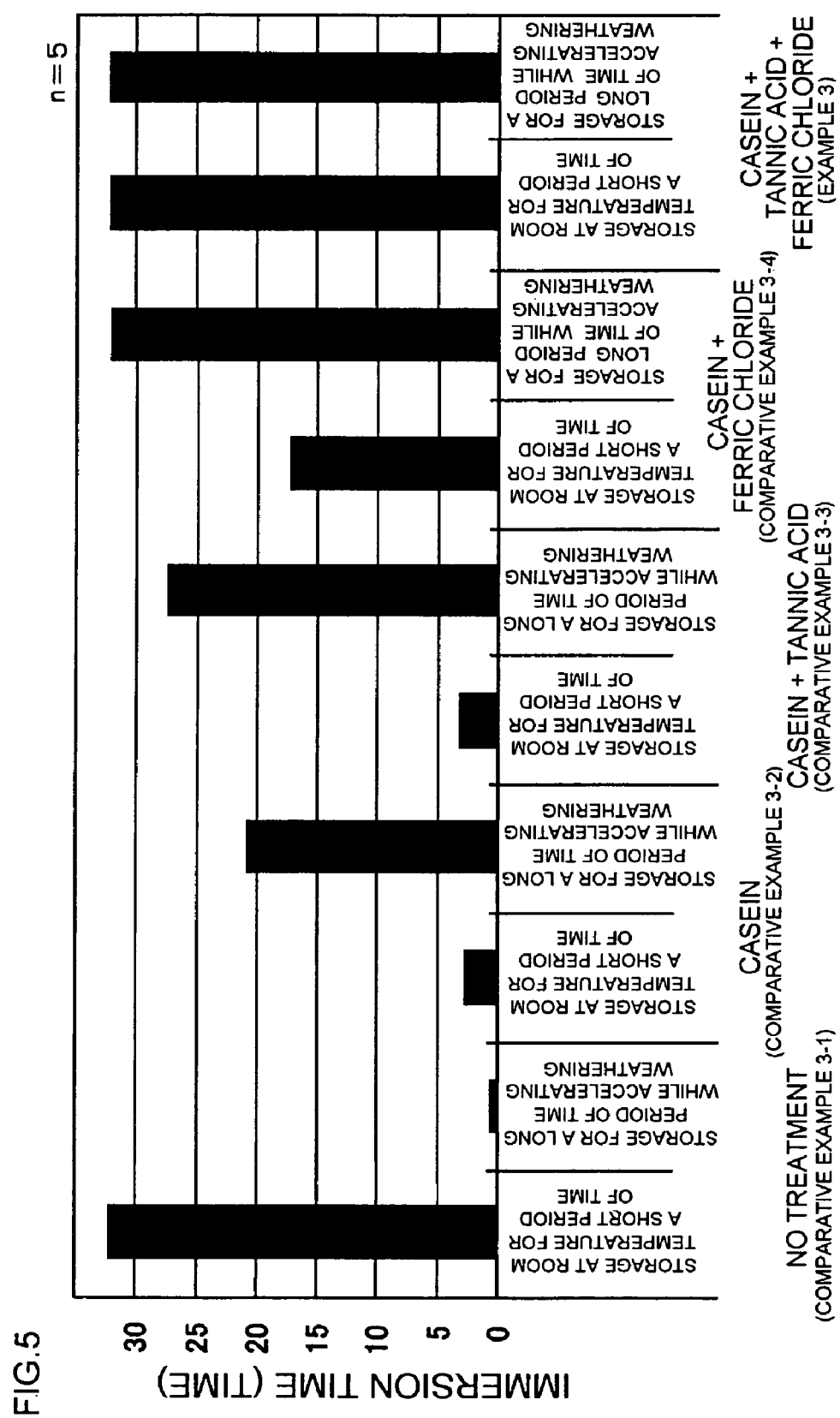
FIG. 5 is an explanatory view of water resistance evaluation test results of Example 3.

Example 3 and Comparative Examples 3-1 to 3-4 above were subjected to the above-described water resistance evaluation test. The results are shown in FIG. 5. In FIG. 5, the "storage at room temperature for a short period of time" represents the case where weathering hardly occurred and the "storage for a long period of time while accelerating weathering" represents the case where weathering is accelerated. Examples and Comparative Examples above were individually subjected to each of the "storage at room temperature for a short period of time" and the "storage for a long period of time while accelerating weathering" five times, and the average value is shown.

In Comparative Example 3-1, the water resistance is excellent when it was not weathered, but when it was weathered, the water resistance sharply decreases. In Comparative Examples 3-2 to 3-4, the water resistance when weathered is improved, but the water resistance when not weathered extremely deteriorates. Example 3 shows excellent water resistance both when weathered and when not weathered.

Therefore, Example 3 achieves high water resistance irrespective of the weathering degree.

Examples 4 and 5 and Comparative Examples Thereof

Next, considering that, among the copper sulfates, calcium hydroxides, or ferric chlorides of the coating agents, the calcium hydroxide is most stable in terms of water resistance of sealing, the water resistance of the sealing was examined while changing the calcium hydroxide concentration in the coating agents and the heating coil passage time.

The heating coil passage time of Example 4 and Comparative Example 4 was adjusted to 3 seconds and the heating coil passage time of Example 5 and Comparative Example 5 was adjusted to 2.2 seconds.

The coating agents used in Examples 4 and 5 are aqueous solutions containing the following components.
Casein: 0.25 wt %
Tannic acid: 0.05 wt %
Calcium hydroxide: 0.005 wt %, 0.01 wt %, 0.025 wt %, 0.05 wt %, 0.07 wt %, and 0.085 wt %
Ammonia: 0.025 vol %

The coating agents used in Comparative Examples 4 and 5 are aqueous solutions containing the following components.
Casein: 0.25 wt %
Tannic acid: 0.05 wt %
Ammonia: 0.025 vol %

Figure 6:
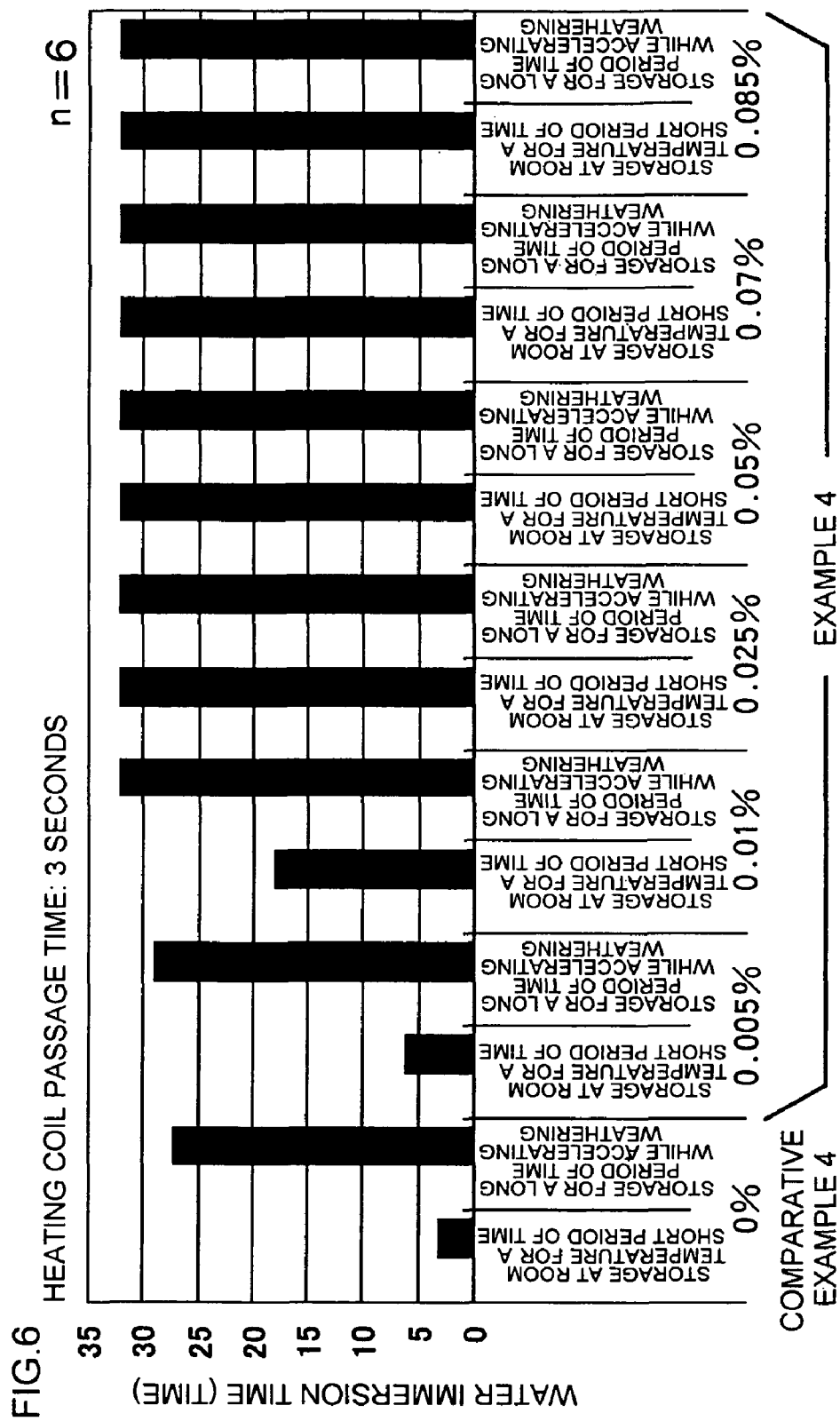
FIG. 6 is an explanatory view of water resistance evaluation test results of Example 4.
Figure 7:
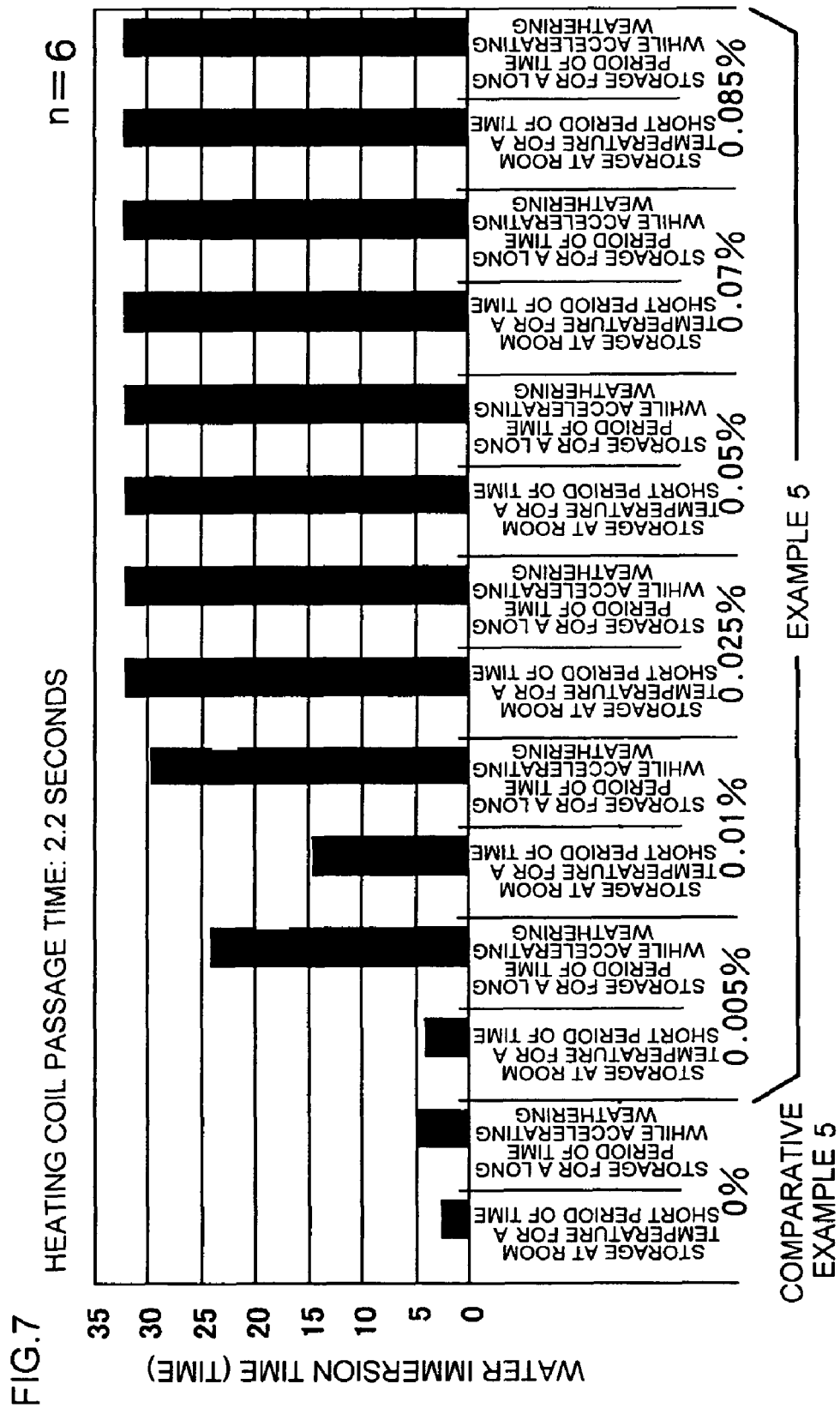
FIG. 7 is an explanatory view of water resistance evaluation test results of Example 5.

The water resistance evaluation test results of Example 4 and Comparative Example 4 are shown in FIG. 6 and the test results thereof of Example 5 and Comparative Example 5 are shown in FIG. 7.

Both Comparative Examples 4 and 5 in which calcium hydroxide was not contained in the coating agents have insufficient water resistance.

In both Examples 4 and 5, the effects are observed from when the calcium hydroxide concentration of the coating agents reach 0.005 wt %. It is considered that remarkable effects are observed when the calcium hydroxide concentration is 0.01 wt % or more and the water resistance causing no problems for practical use is observed when the calcium hydroxide concentration is within the range of 0.01 to 0.085 wt %. It is difficult to dissolve more than 0.1 wt % of calcium hydroxide, and thus a suitable concentration of calcium hydroxide is within the range of 0.01 to 0.1 wt %.

Even when the calcium hydroxide concentration of the coating agent is 0.005 wt % or more, the water resistance ability thereof improves by changing the sealing conditions, such as prolonging the heating coil passage time.

The invention claimed is:

1. A glass container sealing method, comprising:
   hot end coating the top of an opening of a glass container;
   coating the top of the opening of the glass container with a coating agent of an aqueous solution containing casein and polyphenol and one or more members selected from the group consisting of copper sulfates, calcium hydroxides, and ferric chlorides; and
   adhering a sealing material, to which a thermoplastic resin is applied, to the top of the opening of the glass container.

2. The glass container sealing method according to claim 1, wherein the concentration of the casein in the coating agent is 5.0 to 0.05 wt %, the concentration of the polyphenol is 1.0 to 0.01 wt %, the concentration of the copper sulfates, calcium hydroxides, or ferric chlorides is 1.0 to 0.005 wt % in total.

3. The glass container sealing method according to claim 1, wherein the polyphenol is tannic acid or gallic acid.

4. A glass container, which is sealed by the sealing method according to claim 1.

5. A glass container sealing method, comprising:
   hot end coating the top of an opening of the glass container;
   coating the top of the opening of the glass container with a coating agent of an aqueous solution containing 5.0 to 0.05 wt % of casein, 1.0 to 0.01 wt % of polyphenol, and 0.1 to 0.005 wt % of calcium hydroxide; and
   adhering a sealing material, to which a thermoplastic resin is applied, to the top of the opening of the glass container.

6. A coating agent, which is an aqueous solution containing casein and polyphenol and one or more members selected from the group consisting of copper sulfates, calcium hydroxides, and ferric chlorides.

7. The coating agent according to claim 6, wherein the concentration of the casein is 5.0 to 0.05 wt %, the concentration of the polyphenol is 1.0 to 0.01 wt %, the concentration of the copper sulfates, calcium hydroxides, or ferric chlorides is 1.0 to 0.005 wt % in total.

8. The coating agent according to claim 6, wherein the polyphenol is tannic acid or gallic acid.

9. A glass container, in which the top of an opening of the glass container is hot end coated, and the coating agent according to claim 6 is further applied thereto.

10. A coating agent, which is an aqueous solution containing 5.0 to 0.05 wt % of casein, 1.0 to 0.01 wt % of polyphenol, and 0.1 to 0.005 wt % of calcium hydroxide.

* * * * *